(12) United States Patent
Gupta

(10) Patent No.: US 7,930,314 B2
(45) Date of Patent: Apr. 19, 2011

(54) SYSTEMS AND METHODS FOR STORING AND SEARCHING DATA IN A CUSTOMER CENTER ENVIRONMENT

(75) Inventor: Rajan Gupta, Alpharetta, GA (US)

(73) Assignee: Verint Americas Inc., Melville, NY (US)

( * ) Notice: Subject to any disclaimer, the term of this patent is extended or adjusted under 35 U.S.C. 154(b) by 0 days.

(21) Appl. No.: 11/693,899

(22) Filed: Mar. 30, 2007

(65) Prior Publication Data

US 2008/0082502 A1    Apr. 3, 2008

Related U.S. Application Data

(60) Provisional application No. 60/847,872, filed on Sep. 28, 2006.

(51) Int. Cl.
*G06F 17/30* (2006.01)
(52) U.S. Cl. . 707/769; 707/737; 707/770; 707/999.003; 707/999.004; 707/999.005
(58) Field of Classification Search ................ 707/3, 10, 707/100, 770, 802, 999.003, 999.01, 999.1, 707/769; 705/7, 8, 9
See application file for complete search history.

(56) References Cited

U.S. PATENT DOCUMENTS

| | | |
|---|---|---|
| 3,594,919 A | 7/1971 | De Bell et al. |
| 3,705,271 A | 12/1972 | De Bell et al. |
| 4,510,351 A | 4/1985 | Costello et al. |
| 4,684,349 A | 8/1987 | Ferguson et al. |
| 4,694,483 A | 9/1987 | Cheung |
| 4,763,353 A | 8/1988 | Canale et al. |
| 4,815,120 A | 3/1989 | Kosich |
| 4,924,488 A | 5/1990 | Kosich |
| 4,953,159 A | 8/1990 | Hayden et al. |
| 5,016,272 A | 5/1991 | Stubbs et al. |
| 5,101,402 A | 3/1992 | Chiu et al. |
| 5,117,225 A | 5/1992 | Wang |
| 5,210,789 A | 5/1993 | Jeffus et al. |
| 5,239,460 A | 8/1993 | LaRoche |
| 5,241,625 A | 8/1993 | Epard et al. |

(Continued)

FOREIGN PATENT DOCUMENTS

EP    0453128 A2    10/1991

(Continued)

OTHER PUBLICATIONS

Witness Services Network, "Impact 360 Compliance Recording: Reinvented" by Witness Systems, 2005, pp. 1-4.*

(Continued)

*Primary Examiner* — Etienne P LeRoux
*Assistant Examiner* — Monica M Pyo

(57) ABSTRACT

Systems and methods for storing and searching a customer center environment. In this regard, a representative method comprises: generating data from workforce applications, at least one of the workforce applications including at least one of forecasting, scheduling, recording, and monitoring functionalities; storing the data in unstructured databases, at least one of the unstructured databases being operative to communicate with one of the workforce applications, the at least one of the unstructured databases including unstructured data that does not have a data structure; receiving search parameters that are used to search the data in the at least one of the plurality of unstructured databases; searching the at least one of the plurality of unstructured databases according to the search parameters; and displaying search results on a displaying device.

12 Claims, 12 Drawing Sheets

U.S. PATENT DOCUMENTS

| | | |
|---|---|---|
| 5,267,865 A | 12/1993 | Lee et al. |
| 5,299,260 A | 3/1994 | Shaio |
| 5,311,422 A | 5/1994 | Loftin et al. |
| 5,315,711 A | 5/1994 | Barone et al. |
| 5,317,628 A | 5/1994 | Misholi et al. |
| 5,347,306 A | 9/1994 | Nitta |
| 5,388,252 A | 2/1995 | Dreste et al. |
| 5,396,371 A | 3/1995 | Henits et al. |
| 5,432,715 A | 7/1995 | Shigematsu et al. |
| 5,465,286 A | 11/1995 | Clare et al. |
| 5,475,625 A | 12/1995 | Glaschick |
| 5,485,569 A | 1/1996 | Goldman et al. |
| 5,491,780 A | 2/1996 | Fyles et al. |
| 5,499,291 A | 3/1996 | Kepley |
| 5,535,256 A | 7/1996 | Maloney et al. |
| 5,572,652 A | 11/1996 | Robusto et al. |
| 5,577,112 A | 11/1996 | Cambray et al. |
| 5,590,171 A | 12/1996 | Howe et al. |
| 5,597,312 A | 1/1997 | Bloom et al. |
| 5,619,183 A | 4/1997 | Ziegra et al. |
| 5,696,906 A | 12/1997 | Peters et al. |
| 5,717,879 A | 2/1998 | Moran et al. |
| 5,721,842 A | 2/1998 | Beasley et al. |
| 5,742,670 A | 4/1998 | Bennett |
| 5,748,499 A | 5/1998 | Trueblood |
| 5,778,182 A | 7/1998 | Cathey et al. |
| 5,784,452 A | 7/1998 | Carney |
| 5,790,798 A | 8/1998 | Beckett, II et al. |
| 5,796,952 A | 8/1998 | Davis et al. |
| 5,809,247 A | 9/1998 | Richardson et al. |
| 5,809,250 A | 9/1998 | Kisor |
| 5,825,869 A | 10/1998 | Brooks et al. |
| 5,835,572 A | 11/1998 | Richardson, Jr. et al. |
| 5,862,330 A | 1/1999 | Anupam et al. |
| 5,864,772 A | 1/1999 | Alvarado et al. |
| 5,884,032 A | 3/1999 | Bateman et al. |
| 5,907,680 A | 5/1999 | Nielsen |
| 5,918,214 A | 6/1999 | Perkowski |
| 5,923,746 A | 7/1999 | Baker et al. |
| 5,930,764 A * | 7/1999 | Melchione et al. ............. 705/10 |
| 5,933,811 A | 8/1999 | Angles et al. |
| 5,944,791 A | 8/1999 | Scherpbier |
| 5,948,061 A | 9/1999 | Merriman et al. |
| 5,958,016 A | 9/1999 | Chang et al. |
| 5,964,836 A | 10/1999 | Rowe et al. |
| 5,978,648 A | 11/1999 | George et al. |
| 5,982,857 A | 11/1999 | Brady |
| 5,987,466 A | 11/1999 | Greer et al. |
| 5,990,852 A | 11/1999 | Szamrej |
| 5,991,373 A | 11/1999 | Pattison et al. |
| 5,991,796 A | 11/1999 | Anupam et al. |
| 6,005,932 A | 12/1999 | Bloom |
| 6,009,429 A | 12/1999 | Greer et al. |
| 6,014,134 A | 1/2000 | Bell et al. |
| 6,014,647 A | 1/2000 | Nizzari et al. |
| 6,018,619 A | 1/2000 | Allard et al. |
| 6,035,332 A | 3/2000 | Ingrassia et al. |
| 6,038,544 A | 3/2000 | Machin et al. |
| 6,039,575 A | 3/2000 | L'Allier et al. |
| 6,057,841 A | 5/2000 | Thurlow et al. |
| 6,058,163 A | 5/2000 | Pattison et al. |
| 6,061,798 A | 5/2000 | Coley et al. |
| 6,072,860 A | 6/2000 | Kek et al. |
| 6,076,099 A | 6/2000 | Chen et al. |
| 6,078,894 A | 6/2000 | Clawson et al. |
| 6,091,712 A | 7/2000 | Pope et al. |
| 6,108,711 A | 8/2000 | Beck et al. |
| 6,122,665 A | 9/2000 | Bar et al. |
| 6,122,668 A | 9/2000 | Teng et al. |
| 6,130,668 A | 10/2000 | Stein |
| 6,138,139 A | 10/2000 | Beck et al. |
| 6,144,991 A | 11/2000 | England |
| 6,146,148 A | 11/2000 | Stuppy |
| 6,151,622 A | 11/2000 | Fraenkel et al. |
| 6,154,771 A | 11/2000 | Rangan et al. |
| 6,157,808 A | 12/2000 | Hollingsworth |
| 6,171,109 B1 | 1/2001 | Ohsuga |
| 6,182,094 B1 | 1/2001 | Humpleman et al. |
| 6,195,679 B1 | 2/2001 | Bauersfeld et al. |
| 6,201,948 B1 | 3/2001 | Cook et al. |
| 6,211,451 B1 | 4/2001 | Tohgi et al. |
| 6,225,993 B1 | 5/2001 | Lindblad et al. |
| 6,230,197 B1 | 5/2001 | Beck et al. |
| 6,236,977 B1 | 5/2001 | Verba et al. |
| 6,244,758 B1 | 6/2001 | Solymar et al. |
| 6,282,548 B1 | 8/2001 | Burner et al. |
| 6,286,030 B1 | 9/2001 | Wenig et al. |
| 6,286,046 B1 | 9/2001 | Bryant |
| 6,288,753 B1 | 9/2001 | DeNicola et al. |
| 6,289,340 B1 | 9/2001 | Purnam et al. |
| 6,301,462 B1 | 10/2001 | Freeman et al. |
| 6,301,573 B1 | 10/2001 | McIlwaine et al. |
| 6,324,282 B1 | 11/2001 | McIlwaine et al. |
| 6,347,374 B1 | 2/2002 | Drake et al. |
| 6,351,467 B1 | 2/2002 | Dillon |
| 6,353,851 B1 | 3/2002 | Anupam et al. |
| 6,360,250 B1 | 3/2002 | Anupam et al. |
| 6,370,574 B1 | 4/2002 | House et al. |
| 6,404,857 B1 | 6/2002 | Blair et al. |
| 6,411,989 B1 | 6/2002 | Anupam et al. |
| 6,418,471 B1 | 7/2002 | Shelton et al. |
| 6,459,787 B2 | 10/2002 | McIlwaine et al. |
| 6,463,445 B1 * | 10/2002 | Suzuki et al. ................. 707/200 |
| 6,487,195 B1 | 11/2002 | Choung et al. |
| 6,493,758 B1 | 12/2002 | McLain |
| 6,502,131 B1 | 12/2002 | Vaid et al. |
| 6,510,220 B1 | 1/2003 | Beckett, II et al. |
| 6,535,909 B1 | 3/2003 | Rust |
| 6,542,602 B1 | 4/2003 | Elazar |
| 6,546,405 B2 | 4/2003 | Gupta et al. |
| 6,560,328 B1 | 5/2003 | Bondarenko et al. |
| 6,583,806 B2 | 6/2003 | Ludwig et al. |
| 6,606,657 B1 | 8/2003 | Zilberstein et al. |
| 6,665,644 B1 | 12/2003 | Kanevsky et al. |
| 6,674,447 B1 | 1/2004 | Chiang et al. |
| 6,683,633 B2 | 1/2004 | Holtzblatt et al. |
| 6,697,858 B1 | 2/2004 | Ezerzer et al. |
| 6,724,887 B1 | 4/2004 | Eilbacher et al. |
| 6,738,456 B2 | 5/2004 | Wrona et al. |
| 6,757,361 B2 | 6/2004 | Blair et al. |
| 6,772,396 B1 | 8/2004 | Cronin et al. |
| 6,775,377 B2 | 8/2004 | McIlwaine et al. |
| 6,792,575 B1 | 9/2004 | Samaniego et al. |
| 6,810,414 B1 | 10/2004 | Brittain |
| 6,820,083 B1 | 11/2004 | Nagy et al. |
| 6,823,384 B1 | 11/2004 | Wilson et al. |
| 6,870,916 B2 | 3/2005 | Henrikson et al. |
| 6,901,438 B1 | 5/2005 | Davis et al. |
| 6,931,408 B2 * | 8/2005 | Adams et al. ................. 707/100 |
| 6,959,078 B1 | 10/2005 | Eilbacher et al. |
| 6,965,886 B2 | 11/2005 | Govrin et al. |
| 7,146,356 B2 * | 12/2006 | Choi et al. ...................... 707/3 |
| 7,304,855 B1 | 12/2007 | Milligan et al. |
| 7,587,404 B1 * | 9/2009 | Albertelli, Jr. ................ 707/101 |
| 2001/0000962 A1 | 5/2001 | Rajan |
| 2001/0032335 A1 | 10/2001 | Jones |
| 2001/0043697 A1 | 11/2001 | Cox et al. |
| 2002/0038363 A1 | 3/2002 | MacLean |
| 2002/0052948 A1 | 5/2002 | Baudu et al. |
| 2002/0065911 A1 | 5/2002 | Von Klopp et al. |
| 2002/0065912 A1 | 5/2002 | Catchpole et al. |
| 2002/0128925 A1 | 9/2002 | Angeles |
| 2002/0143925 A1 | 10/2002 | Pricer et al. |
| 2002/0165954 A1 | 11/2002 | Eshghi et al. |
| 2003/0055883 A1 | 3/2003 | Wiles et al. |
| 2003/0079020 A1 | 4/2003 | Gourraud et al. |
| 2003/0144900 A1 | 7/2003 | Whitmer |
| 2003/0154240 A1 | 8/2003 | Nygren et al. |
| 2004/0100507 A1 | 5/2004 | Hayner et al. |
| 2004/0165717 A1 | 8/2004 | McIlwaine et al. |
| 2005/0135607 A1 | 6/2005 | Lee et al. |

FOREIGN PATENT DOCUMENTS

| | | |
|---|---|---|
| EP | 0773687 A2 | 5/1997 |
| EP | 0989720 | 3/2000 |

| | | |
|---|---|---|
| GB | 2369263 | 5/2002 |
| WO | WO 98/43380 | 11/1998 |
| WO | WO 00/16207 | 3/2000 |

OTHER PUBLICATIONS

"Customer Spotlight: Navistar International," Web page, unverified print date of Apr. 1, 2002.
"DKSystems Integrates QM Perception with OnTrack for Training," Web page, unverified print date of Apr. 1, 2002, unverified cover date of Jun. 15, 1999.
"OnTrack Online" Delivers New Web Functionality, Web page, unverified print date of Apr. 2, 2002, unverified cover date of Oct. 5, 1999.
"Price WaterouseCoopers Case Study" The Business Challenge, Web page, unverified cover date of 2000.
Abstract, net.working: "An Online Webliography,"*Technical Training* pp. 4-5 (Nov.-Dec. 1998).
Adams et al., "Our Turn-of-the-Century Trend Watch" *Technical Training* pp. 46-47 (Nov./Dec. 1998).
Barron, "The Road to Performance: Three Vignettes," *Technical Skills and Training* pp. 12-14 (Jan. 1997).
Bauer, "Technology Tools: Just-in-Time Desktop Training is Quick, Easy, and Affordable," *Technical Training* pp. 811 (May/Jun. 1998).
Beck et al., "Applications of A1 in Education," *AMC Crossroads* vol. 1: 1-13 (Fall 1996) Web page, unverified print date of Apr. 12, 2002.
Benson and Cheney, "Best Practices in Training Delivery," *Technical Training* pp. 14-17 (Oct. 1996).
Bental and Cawsey, "Personalized and Adaptive Systems for Medical Consumer Applications," Communications ACM 45(5): 62-63 (May 2002).
Benyon and Murray, "Adaptive Systems: from intelligent tutoring to autonomous agents," pp. 152, Web page, unknown date.
Blumenthal et al., "Reducing Development Costs with Intelligent Tutoring System Shells," pp. 1-5, Web page, unverified print date of Apr. 9, 2002, unverified cover date of Jun. 10, 1996.
Brusilosy et al., "Distributed intelligent tutoring on the Web," Proceedings of the 8$^{th}$ World Conference of the AIED Society, Kobe, Japan, Aug. 18-22, pp. 1-9 Web page, unverified print date of Apr. 12, 2002, unverified cover date of Aug. 18-22, 1997.
Brusilovsky and Pesin, ISIS-Tutor: An Intelligent Learning Environment for CD/ISIS Users, pp. 1-15 Web page, unverified print date of May 2, 2002.
Brusilovsky, "Adaptive Educational Systems on the World-Wide-Web: A Review of Available Technologies," pp. 1-10, Web Page, unverified print date of Apr. 12, 2002.
Byrnes et al., "The Development of a Multiple-Choice and True-False Testing Environment on the Web," pp. 1-8, Web page, unverified print date of Apr. 12, 2002, unverified cover date of 1995.
Calvi and DeBra, "Improving the Usability of Hypertext Courseware through Adaptive Linking,"*ACM*, unknown page numbers (1997).
Coffey, "Are Performance Objectives Really Necessary?" *Technical Skills and Training* pp. 25-27 (Oct. 1995).
Cohen, "Knowledge Management's Killer App," pp. 1-11, Web page, unverified print date of Sep. 12, 2002, unverified cover date of 2001.
Cole-Gomolski, "New Ways to manage E-Classes," *Computerworld* 32(48):4344 (Nov. 30, 1998).
Cross: "Sun Microsystems—the SunTAN Story," Internet Time Group 8 (© 2001).
Cybulski and Linden, "Teaching Systems Analysis and Design Using Multimedia and Patterns," unknown date, unknown source.
De Bra et al., "Adaptive Hypermedia: From Systems to Framework,"*ACM* (2000).
De Bra, "Adaptive Educational Hypermedia on the Web," *Communications ACM* 45(5):60-61 (May 2002).
Dennis and Gruner, "Computer Managed Instruction at Arthur Andersen & Company: A Status Report,"*Educational Technical* pp. 7-16 (Mar. 1992).
Diessel et al., "Individualized Course Generation: A Marriage Between CAL and ICAL,"*Computers Educational* 22(1/2) 57-65 (1994).
Dyreson, "An Experiment in Class Management Using the World Wide Web," pp. 1-12, Web page, unverified print date of Apr. 12, 2002.
E Learning Community, "Excellence in Practice Award: Electronic Learning Technologies,"*Personal Learning Network* pp. 1-11, Web page, unverified print date of Apr. 12, 2002.
Eklund and Brusilovsky, "The Value of Adaptivity in Hypermedia Learning Environments: A Short Review of Empirical Evidence," pp. 1-8, Web page, unverified print date of May 2, 2002.
*e-Learning the future of learning*, THINQ Limited, London, Version 1.0 (2000).
Eline, "A Trainer's Guide to Skill Building," *Technical Training* pp. 34-41 (Sep./Oct. 1998).
Eline, "Case Study: Briding the Gap in Canada's IT Skills," *Technical Skills and Training* pp. 23-25 (Jul. 1997).
Eline "Case Study: IBT's Place in the Sun," *Technical Training* pp. 12-17 (Aug./Sep. 1997).
Fritz, "CB templates for productivity: Authoring system templates for trainers,"*Emedia Professional* 10(8):6678 (Aug. 1997).
Fritz, "ToolBook II: Asymetrix's updated authoring software tackles the Web,"*Emedia Professional* 10(20): 102106 (Feb. 1997).
Gibson et al., "A Comparative Analysis of Web-Based Testing and Evaluation Systems," pp. 1-8, Web page, unverified print date of Apr. 11, 2002.
Halberg and DeFiore, "Curving Toward Performance: Following a Hierarchy of Steps Toward a Performance Orientation," *Technical Skills and Training* pp. 9-11 (Jan. 1997).
Harsha, "Online Training 'Sprints' Ahead," *Technical Training* pp. 27-29 (Jan./Feb. 1999).
Heideman, "Training Technicians for a High-Tech Future: These six steps can help develop technician training for high-tech work," pp. 11-14 (Feb./Mar. 1995).
Heideman, "Writing Performance Objectives Simple as A-B-C (and D)," *Technical Skills and Training* pp. 5-7 (May/Jun. 1996).
Hollman, "Train Without Pain: The Benefits of Computer-Based Training Tools," pp. 1-11, Web page, unverified print date of Mar. 20, 2002, unverified cover date of Jan. 1, 2000.
Klein, "Command Decision Training Support Technology," Web page, unverified print date of Apr. 12, 2002.
Koonce, "Where Technology and Training Meet," *Technical Training* pp. 10-15 (Nov./Dec. 1998).
Kursh, "Going the distance with Web-based training," *Training and Development* 52(3): 5053 (Mar. 1998).
Larson, "Enhancing Performance Through Customized Online Learning Support,"*Technical Skills and Training* pp. 25-27 (May/Jun. 1997).
Linton, et al. "OWL: A Recommender System for Organization-Wide Learning," *Educational Technical Society* 3(1): 62-76 (2000).
Lucadamo and Cheney, "Best Practices in Technical Training," *Technical Training* pp. 21-26 (Oct. 1997).
McNamara, "Monitoring Solutions: Quality Must be Seen and Heard," *Inbound/Outbound* pp. 66-67 (Dec. 1989).
Merrill, "The New Component Design Theory: Instruction design for courseware authoring,"*Instructional Science* 16:19-34 (1987).
Minton-Eversole, "IBT Training Truths Behind the Hype," *Technical Skills and Training* pp. 15-19 (Jan. 1997).
Mizoguchi, "Intelligent Tutoring Systems: The Current State of the Art," Trans. IEICE E73(3):297-307 (Mar. 1990).
Mostow and Aist, "The Sounds of Silence: Towards Automated Evaluation of Student Leaning a Reading Tutor that Listens" *American Association for Artificial Intelligence*, Web page, unknown date Aug. 1997.
Mullier et al., "A Web base Intelligent Tutoring System," pp. 1-6, Web page, unverified print date of May 2, 2002.
Nash, Database Marketing, 1993, pp. 158-165, 172-185, McGraw Hill, Inc. USA.
Nelson et al. "The Assessment of *End-User Training Needs,*" *Communications ACM* 38(7):27-39 (Jul. 1995).
O'Herron, "CenterForce Technologies CenterForce Analyzer," Web page unverified print dateof Mar. 2, 2002, unverified cover date of Jun. 1, 1999.
O'Roark, "Basic Skills Get a Boost," Technical Training pp. 10-13 (Jul./Aug. 1998).

Pamphlet, On Evaluating Educational Innovations[1], authored by Alan Lesgold, unverified cover date of Mar. 5, 1998.
Papa et al., "A Differential Diagnostic Skills Assessment and Tutorial Tool," *Computer Education* 18(1-3):45-50 (1992).
PCT International Search Report, International Application No. PCT/US03/02541, mailed May 12, 2003.
Phaup, "New Software Puts Computerized Tests on the Internet: Presence Corporation announces breakthrough Question Mark™ Web Product," Web page, unverified print date of Apr. 1, 2002.
Phaup, "QM Perception™ Links with Integrity Training's WBT Manager™ to Provide Enhanced Assessments of Web Based Courses," Web page, unverified print date of Apr. 1, 2002, unverified cover date of Mar. 25, 1999.
Phaup, "Question Mark Introduces Access Export Software," Web page, unverified print date of Apr. 2, 2002, unverified cover date of Mar. 1, 1997.
Phaup, "Question Mark Offers Instant Online Feedback for Web Quizzes and Questionnaires: Univerity of California assist with Beta Testing, Server scripts now available on high-volume users," Web page, unverified print date of Apr. 1, 2002, unverified cover date of May 6, 1996.
Piskurich, Now-You-See-'Em, Now-You-Don't Learning Centers, *Technical Training* pp. 18-21 (Jan./Feb. 1999).
Read, "Sharpening Agents' Skills," pp. 1-15, Web page, unverified print date of Mar. 20, 2002, unverified cover date of Oct. 1, 1999.
Reid, "On Target: Assessing Technical Skills," *Technical Skills and Training* pp. 6-8 (May/Jun. 1995).
Stormes, "Case Study: Restructuring Technical Training Using ISD," *Technical Skills and Training* pp. 23-26 (Feb./Mar. 1997).
Tennyson, "Artificial Intelligence Methods in Computer-Based Instructional Design," Journal of Instructional Development 7(3): 17-22 (1984).
The Editors, Call Center, "The Most Innovative Call Center Products We Saw in 1999," Web page, unverified print date of Mar. 20, 2002, unverified cover date of Feb. 1, 2000.
Tinoco et al., "Online Evaluation in WWW-based Courseware," *ACM* pp. 194-198 (1997).
Uiterwijk et al., "The virtual classroom," *InfoWorld* 20(47):6467 (Nov. 23, 1998).
Unknown Author, "Long-distance learning," *Info World* 20(36):7676 (1998).
Untitled, 10th Mediterranean Electrotechnical Conference vol. 1 pp. 124-126 (2000).
Watson and Belland, "Use of Learner Data in Selecting Instructional Content for Continuing Education," *Journal of Instructional Development* 8(4):29-33 (1985).
Weinschenk, "Performance Specifications as Change Agents," *Technical Training* pp. 12-15 (Oct. 1997).
Witness Systems promotional brochure for eQuality entitled "Bringing eQualityto Business".
Witness Systems promotional brochure for eQuality entitled "Building Customer Loyalty Through BusinessDriven Recording of Multimedia Interactions in your Contact Center," (2000).
Aspect Call Center Product Specification, "Release 2.0", Aspect Telecommuications Corporation, May 23, 1998 798.
Metheus X Window Record and Playback, XRP Features and Benefits, 2 pages Sep. 1994 LPRs.
"Keeping an Eye on Your Agents," Call Center Magazine, pp. 32-34, Feb. 1993 LPRs & 798.

Anderson: Interactive TVs New Approach, The Standard, Oct. 1, 1999.
Ante, *Everything You Ever Wanted to Know About Cryptography Legislation . . . (But Were to Sensible to Ask)*, PC world Online, Dec. 14, 1999.
Berst, *It's Baa-aack. How Interative TV is Sneaking Into Your Living Room*, The AnchorDesk, May 10, 1999.
Berst, *Why Interactive TV Won't Turn You On (Yet)*, The AnchorDesk, Jul. 13, 1999.
Borland and Davis, *US West Plans Web Services on TV*, CNETNews. com, Nov. 22, 1999.
Brown, *Let PC Technology Be Your TV Guide*, PC Magazine, Jun. 7, 1999.
Brown, *Interactive TV: The Sequel*, NewMedia, Feb. 10, 1998.
Cline, Déjà vu—*Will Interactive TV Make It This Time Around?*, DevHead, Jul. 9, 1999.
Crouch, *TV Channels on the Web*, PC World, Sep. 15, 1999.
D'Amico, *Interactive TV Gets $99 set-top box*, IDG.net, Oct. 6, 1999.
Davis, *Satellite Systems Gear Up for Interactive TV Fight*, CNETNews.com, Sep. 30, 1999.
Diederich, *Web TV Data Gathering Raises Privacy Concerns*, ComputerWorld, Oct. 13, 1998.
*Digital Broadcasting*, Interactive TV News.
*EchoStar, MediaX Mix Interactive Multimedia With Interactive Television*, PRNews Wire, Jan. 11, 1999.
Furger, *The Internet Meets the Couch Potato*, PCWorld, Oct. 1996.
*Hong Kong Comes First with Interactive TV*, SCI-TECH, Dec. 4, 1997.
*Interactive TV Overview TimeLine*, Interactive TV News.
*Interactive TV Wars Heat Up*, Industry Standard.
Needle, *Will The Net Kill Network TV?* PC World Online, Mar. 10, 1999.
Kane, *AOL-Tivo: You've Got Interactive TV*, ZDNN, Aug. 17, 1999.
Kay, *E-Mail in Your Kitchen*, PC World Online, 093/28/96.
Kenny, *TV Meets Internet*, PC World Online, Mar. 28, 1996.
Linderholm, *Avatar Debuts Home Theater PC*, PC World Online, Dec. 1, 1999.
Mendoza, *Order Pizza WhileYou Watch*, ABCNews.com.
Moody, *WebTV: What the Big Deal?*, ABCNews.com.
Murdorf, et al., *Interactive Television—Is There Life After the Internet?*, Interactive TV News.
Needle, *PC, TV or Both?*, PC World Online.
*Interview with Steve Perlman*, CEO of Web-TV Networks, PC World Online.
Press, *Two Cultures, The Internet and Interactive TV*, Universite de Montreal.
Reuters, *Will TV Take Over Your PC?*, PC World Online.
Rohde, *Gates Touts Interactive TV*, InfoWorld, Oct. 14, 1999.
Ross, *Broadcasters Use TV Signals to Send Data*, PC World Oct. 1996.
Schlisserman, *Is Web TV a Lethal Weapon?*, PC World Online.
Stewart, *Interactive Television at Home: Television Meets the Internet*, Aug. 1998.
Swedlow, *Computer TV Shows: Ready for Prime Time?*, PC World Online.
Wilson, *U.S. West Revisits Interactive TV*, Interactive Week, Nov. 28, 1999.

* cited by examiner

Structured Database

| Agent ID | Date | Talkover Start Time | Talkover End Time | Ring Time | Number of Transfers |
|---|---|---|---|---|---|
| Agent 036 | January 1, 2003 | 8:30 AM | 8:60 AM | 8:25 AM | 0 |
| Agent 366 | December 19, 2002 | 12:00 PM | 1:05 PM | 11:65 PM | 0 |
| Agent 367 | December 17, 2002 | 5:30 AM | 7:00 AM | 5:29 AM | 1 |
| Agent 685 | July 7, 2002 | 7:00 AM | 7:05 AM | 6:57 AM | 1 |
| Agent 958 | September 11, 2001 | 9:00 PM | 9:65 PM | 8:50 PM | 0 |
| Agent 365 | July 21, 2001 | 10:00 AM | 10:05 AM | 9:20 AM | 0 |
| Agent 675 | August 30, 2000 | 3:30 PM | 3:60 PM | 3:10 PM | 2 |
| ... | ... | ... | ... | ... | ... |

FIG. 6

SYSTEMS AND METHODS FOR STORING AND SEARCHING DATA IN A CUSTOMER CENTER ENVIRONMENT

CROSS-REFERENCE TO RELATED APPLICATION

This application claims the benefit of copending U.S. provisional application entitled, "Systems and Methods for Searching Data in a Customer Center Environment," having Ser. No. 60/847,872, filed Sep. 28, 2006, which is entirely incorporated herein by reference, and is related to U.S. application Ser. No. 11/693,857, entitled, "Systems and Methods For Storing And Searching Data in a Customer Center Environment," filed on Mar. 30, 2007, which is entirely incorporated herein by reference.

TECHNICAL FIELD

The present disclosure is generally related to storing and searching data in a customer center environment.

BACKGROUND

The business of a call center, also known as a customer center, is to provide rapid and efficient interaction between agents and customers (or prospective customers). Existing solutions require the purchase of multiple hardware and software components, typically from different vendors, to achieve the business goals of the customer center. The use of separate systems of components leads to a variety of problems. For instance, each system typically has its own method of configuration and its own user interface. Thus, exchanging data between the systems typically requires additional work by someone at the customer center.

Furthermore, customer centers are continually tasked with striking a balance between service quality, efficiency, effectiveness, revenue generation, cost cutting, and profitability, among others. As a result, today's customer center agents are charged with mastering multiple data sources and systems, delivering consistent service across customer touch points, up-selling, cross-selling, and saving at-risk customers, while winning new ones.

Data in the data sources and systems is typically stored in a structured database. The structured database is continually changing and growing due to the technological changes and development of customer centers. Because of compliance regulations, the structured database typically stores data for the recorded contacts for a long duration, such as seven (7) to ten (10) years. Thus, the structured database is increasingly large in size of storage and complicated to use, which may result in the increase of maintenance and licensing costs, the addition of more hardware, and the unreliable predictability in performance in querying the structured database.

SUMMARY

Systems and methods for searching in a customer center environment are provided. In this regard, a representative method comprises: generating data from a plurality of workforce applications, at least one of the plurality of workforce applications including at least one of forecasting, scheduling, recording, and monitoring functionalities; storing the data in a plurality of unstructured databases, at least one of the plurality of unstructured databases being operative to communicate with one of the plurality of workforce applications, the at least one of the plurality of unstructured databases including a plurality of unstructured data that does not have a data structure; receiving search parameters that are used to search the data in the at least one of the plurality of unstructured databases; searching the at least one of the plurality of unstructured databases according to the search parameters; and displaying search results on a displaying device.

A system for storing and searching in a customer center system comprising a plurality of workforce applications that includes at least one of forecasting, scheduling, recording, and monitoring functionalities. The workforce applications are operative to generate data related to customer center functionalities. The system further includes a plurality of unstructured databases being operative to store the generated data, the unstructured databases of which are operative to communicate with the at least one of the plurality of workforce applications. The system further includes a search engine operative to perform at least one of the following: receive search parameters that are used to search the data in the plurality of unstructured databases, search the plurality of unstructured databases according to the search parameters, and display search results on a display device. The system further includes a plurality of structured databases, the structured databases of which include data that has been categorized. The search engine is operative to search the structured databases according to the search parameters and determine whether the search results are from the plurality of structured database or the plurality of unstructured database.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, there is no intent to limit the disclosure to the embodiment or embodiments disclosed herein. On the contrary, the intent is to cover all alternatives, modifications and equivalents.

FIG. 6 is an exemplary structured database, such as that shown in FIG. 3;

DETAILED DESCRIPTION

Disclosed herein are systems and methods for storing and searching data in a customer center environment. A customer center can include, but is not limited to, outsourced contact centers, outsourced customer relationship management, customer relationship management, voice of the customer, customer interaction, contact center, multi-media contact center, remote office, distributed enterprise, work-at-home agents, remote agents, branch office, back office, performance optimization, workforce optimization, hosted contact centers, payroll systems, and speech analytics, for example.

Additionally, included in this disclosure are embodiments of integrated workforce optimization platforms, as discussed in U.S. application Ser. No. 11/359,356, filed on Feb. 22, 2006, entitled "Systems and Methods for Workforce Optimization," which is hereby incorporated by reference in its entirety. At least one embodiment of an integrated workforce optimization platform integrates: (1) Quality Monitoring/Call Recording—voice of the customer; the complete customer experience across multimedia touch points; (2) Workforce Management—strategic forecasting and scheduling that drives efficiency and adherence, aids in planning, and helps facilitate optimum staffing and service levels; (3) Performance Management—key performance indicators (KPIs) and scorecards that analyze and help identify synergies, opportunities and improvement areas; (4) e-Learning—training, new information and protocol disseminated to staff, leveraging best practice customer interactions and delivering learning to support development; and/or (5) Analytics—deliver insights from customer interactions to drive business performance. By way of example, the integrated workforce optimization process and system can include planning and establishing goals—from both an enterprise and center perspective—to ensure alignment and objectives that complement and support one another. Such planning may be complemented with forecasting and scheduling of the workforce to ensure optimum service levels. Recording and measuring performance may also be utilized, leveraging quality monitoring/call recording to assess service quality and the customer experience.

Exemplary systems are first discussed with reference to the figures. Although these systems are described in detail, they are provided for purposes of illustration only and various modifications are feasible. After the exemplary systems are described, examples of flow diagrams of the systems are provided to explain the manner in which data can be stored and searched.

Figure 1:
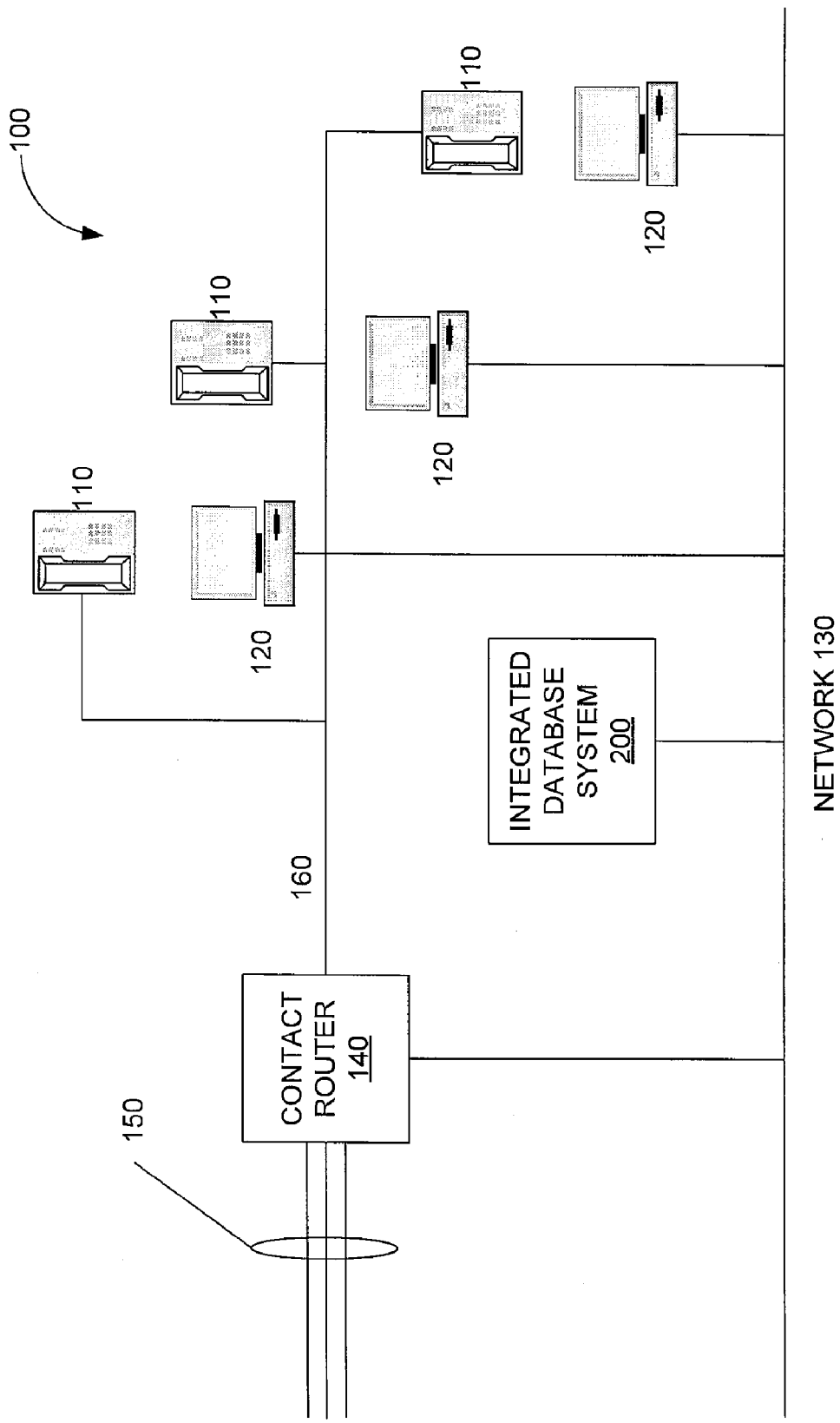
FIG. 1 illustrates an embodiment of a customer center environment.

Referring now in more detail to the figures, FIG. 1 illustrates an embodiment of a customer center environment 100. The customer center environment 100 is staffed by agents who handle incoming and/or outgoing contacts. Although the traditional and most common form of contact is by phone, other types of contacts are becoming more common (e.g., text chat, web collaboration, email, and fax, among others). An agent workspace can include an agent phone 110 and a workstation computer 120. A network 130 connects one or more of the workstations 120.

A contact router 140 distributes incoming contacts to available agents. For example, when the contacts are made by traditional phone lines, the contact router 140 operates by connecting outside trunk lines 150 to agent trunk lines 160. In this environment, the contact router 140 may be implemented by an automatic call distributor (ACD), which queues calls until a suitable agent is available. Other types of contacts, such as Voice over Internet Protocol (VoIP) calls and computer-based contacts (e.g., chat and email), are routed over one or more data networks. These contacts are distributed over network 130 to one of the agent workstations 120. Alternatively or additionally, the contact router 140 can include, but is not limited to, an instant messenger (IM) server, an e-mail server, and a computer telephony integration (CTI) server, among others.

Figure 2:
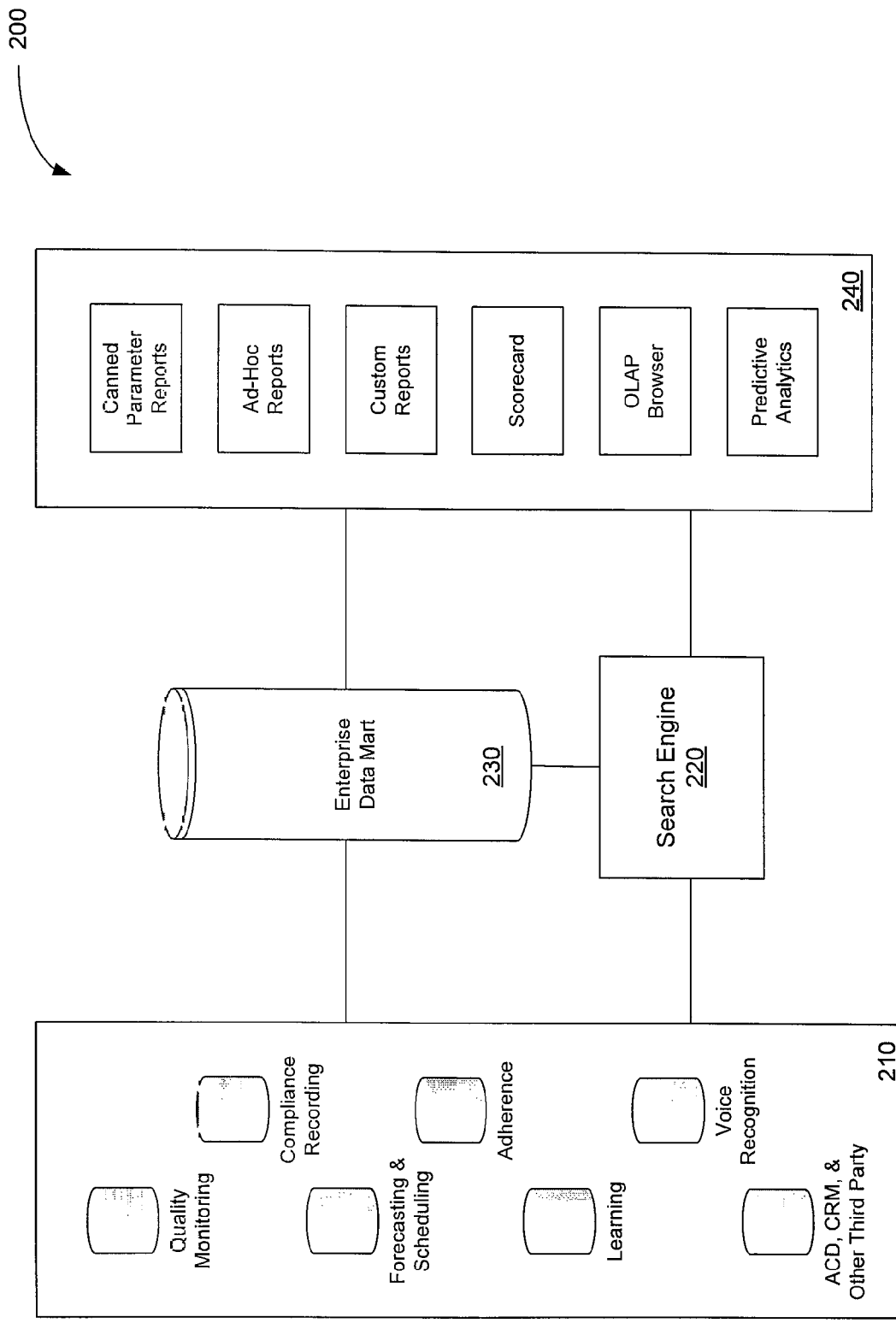
FIG. 2 is a high-level view illustrating an embodiment of a customer center system that includes a data source, data mart, data processing, and search engine.

FIG. 2 is a high-level view illustrating an embodiment of a customer center system 200 that includes a data source, data mart, data processing and search engine. The data source 210 has different agent workforce related applications, executables, processes or services, including quality monitoring, forecasting and scheduling, compliance recording, adherence, learning, voice recognition, ACD, CRM (customer relationship management) and/or other third party applications, among others.

Typical use of the agent workforce related applications results in data being provided to one or more databases. The data can be extracted, transformed, and loaded in an enterprise data mart 230. The data processing 240 can access the data to provide parameter reports, ad-hoc reports, custom reports, scorecards, an on-line analytical processing (OLAP) browser, and predictive analytics, among others.

Alternatively or additionally, data generated from the applications, such as quality monitoring, forecasting and scheduling, compliance recording, adherence, learning, and voice recognition, can be stored in the data source 210 in multiple respective databases (not shown). The operation of the applications is further described in relation to FIGS. 8 and 9.

The subject matter related to the data source 210, data mart 230 and data processing 240 is related to the subject matter disclosed in a pending U.S. patent application, which is entitled "Systems and Methods For Contact Center Analysis," U.S. application Ser. No. 11/479,267, filed on Jun. 30, 2006, and incorporated by reference herein in its entirety.

The search engine 220 can be deployed at a centralized location, e.g., within a customer center, and/or embedded into a network as a service on the network and/or as intelligence in the network infrastructure. The search engine 220 communicates with the data source 210, data mart 230, and data processing 240 to search and retrieve data based on search parameters. The data source 210, data mart 230 and data processing 240 store data in either a structured database or unstructured database, or both. The structured database includes structured data, which are generally information that has been broken down and categorized. The structured database is further described in relation to FIG. 6.

The unstructured database includes a plurality of unstructured data, which are generally information that do not have a data structure. Examples of unstructured data may include, but is not limited to, audio, video, recorded contacts metadata, such as, but not limited to, start-time and end-time of the call, agentID, customerID, and location of audio file, among others, and unstructured text, such as, but not limited to, the body of an email or word processor document. The unstructured database is further described in relation to FIG. 7.

The search engine 220 receives a query from a user and processes the query using a search algorithm. The search engine 220 searches either the structured database or unstructured database, or both, based on the query. The search engine 220 provides a search result in text format. The operation of the search engine 220 is further described in relation to FIGS. 8 and 10.

Figure 3:
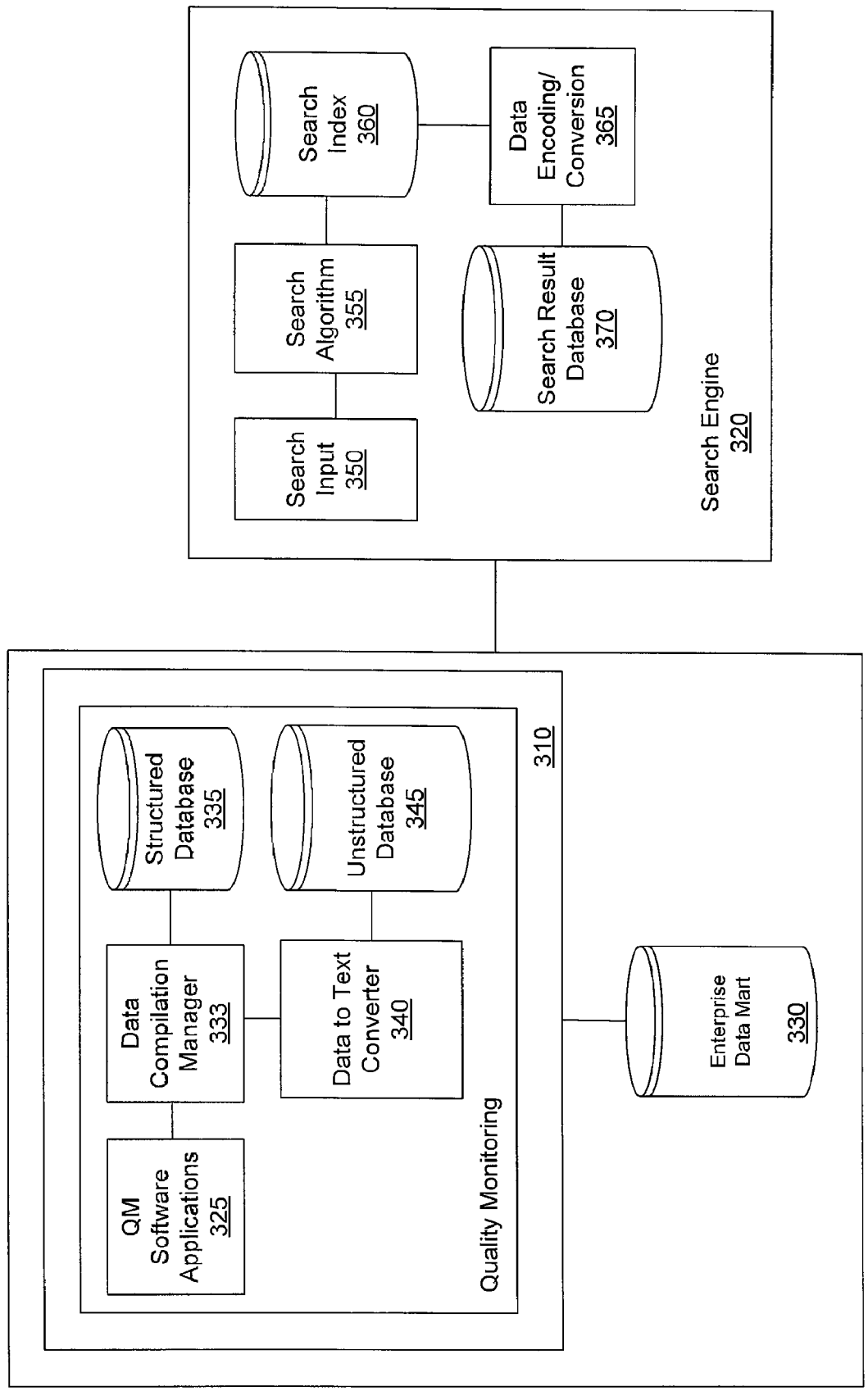
FIG. 3 is a block diagram illustrating an embodiment of a search engine and a data source in greater detail.

FIG. 3 is a block diagram illustrating an embodiment of a search engine and a data source in greater detail. In this embodiment, the data source 310 includes quality monitoring (QM) which further includes QM software applications 325. The applications 325 generate data related to quality monitoring that is gathered and sent to a data compilation manager 333. The data compilation manager 333 determines whether at least some portions of the data should be stored in either a structured database 335 or an unstructured database 345, or both, based on the content of the data.

If the data is to be stored in the structured database 335, then at least some portions of the data are transmitted to the structured database 335. For example, the data compilation manager 333 can determine if the data includes, by way of example, but is not limited to, agent ID, date of CTI event, talkover start time, talkover end time, ring time, and number of transfers, among others. Responsive to the determination, at least some portions of the data are transmitted, stored and categorized in the structured database 335.

If the data compilation manager 345 makes a determination to store the data in the unstructured database 345, then at least some portions of the data are transmitted to the data-to-text converter 340. For example, the data compilation manager 333 can be configured to transmit the data that is not stored in the structured database to the unstructured database 345. Alternatively or additionally, the data compilation manager 333 can be configured to transmit all data from the quality monitoring to the unstructured database, including data that is stored in the structured database.

The data-to-text converter 340 receives the data from the data compilation manager 333 and converts the data to a text format, such as an extensible Markup Language (XML) or HyperText Markup Language (HTML) format. The converted data is transmitted and stored in the unstructured database 345. Alternatively or additionally, the data being stored in the databases 335, 345 can also be stored in an enterprise data mart 330. The enterprise data mart 330 can be used as a long-term storage whereas the databases 335, 345 can be used as a short-term storage.

Metadata can be included in the converted data that can facilitate indexing. For example, the metadata includes specified key words and concepts under which the data can be indexed. This can be helpful, especially in cases in which the words in the data might have multiple meanings. The metadata can guide the search engine in choosing which of the meanings for these words is correct. The search engine 320 can confirm whether the metadata is correct by correlating metadata with content and rejecting the metadata that does not match the words in the data.

The search engine 320 includes a search parameter input 350, which receives search parameters (or a query) from a user. The parameters are then used by a search algorithm 355 to search the databases 330, 335, 345. The search parameters can involve one or more words with the use of Boolean operators that allow the user to refine and extend the terms of the search. The Boolean operators most often seen are:

AND—All the terms joined by "AND" must appear in the pages or documents. Some search engines substitute the operator "+" for the word AND.

OR—At least one of the terms joined by "OR" must appear in the pages or documents.

NOT—The term or terms following "NOT" must not appear in the pages or documents. Some search engines substitute the operator "−" for the word NOT.

FOLLOWED BY—One of the terms must be directly followed by the other.

NEAR—One of the terms must be within a specified number of words of the other.

Quotation Marks—The words between the quotation marks are treated as a phrase, and that phrase must be found within the document or file.

Alternatively or additionally, the search engine 320 includes a feature of a conditional search with conditional expressions, such as ten (10) instances of transferred calls found in a document for a particular contact. Alternatively or additionally, the search algorithm 355 can define the search parameter as literal searches. That is, the search algorithm 355 searches for the words or phrases exactly as the words are entered in the search parameter input 350.

Alternatively or additionally, the search algorithm 355 can define the search parameters as concept-based searches that use statistical analysis on the data containing the words or phrases defined in the search parameters. Alternatively or additionally, the search algorithm 355 can define the search parameters as natural-language queries. The search parameters in the natural-language queries are in the form of a question in the same way a person would ask another person.

The search results of the search algorithm 355 are then indexed by a search index 360. The search index 360 can highlight the words in the search results that were used in the search parameter and prioritize the search results. The search index 360 can include the number of times that the word appears in the search results. The search index 360 can assign a "weight" to each entry, with increasing values assigned to the words as the words appear near the top of the document, in sub-headings, in links, in the metadata or in the title of the document, among others.

The search index 360 allows information to be found quickly. An example of the index is a hash table. When using a hash table (or "hashing"), a formula is applied to attach a numerical value (or hash value) to each word. The formula is designed to evenly distribute the entries across a predetermined number of divisions. This numerical distribution is different from the distribution of words across the alphabet.

For example, in the English vocabulary, there are more words that begin with some letters than other letters. For instance, there are more words that begin with the letter "M" than the letter "X". This means that finding a word beginning with the letter "M" could take much longer than finding a word that begins with letter "X". The hash table contains a hash value along with a pointer to the actual data, which can be sorted in a way that allows the data to be stored most efficiently. The combination of efficient indexing and effective storage facilitates getting results quickly, even when the user creates a complicated search. Another example related to a contact center is searching for calls with a customer ID="X", called on Jan. 1, 1997, and associated with Agent="Bob" on Campaign="Sell Shares".

The search results are then sent to a data encoding/conversion 365, which determines whether to convert the search result to a text format. If the search result is to be converted, the encoding/conversion 365 converts the search results to a text format, such as an XML or HTML format. If the data of the search results is in the text format, the data is then transmitted and stored in a search result database 370.

Alternatively or additionally, the search engine 320 can be configured to search in the structured database 335 for specific contact attribute search criteria. The search engine 320 can include a specific graphical user interface (not shown) and specific query composition (not shown) that enables the search engine 320 to communicate with the structured database 335.

Figure 4:
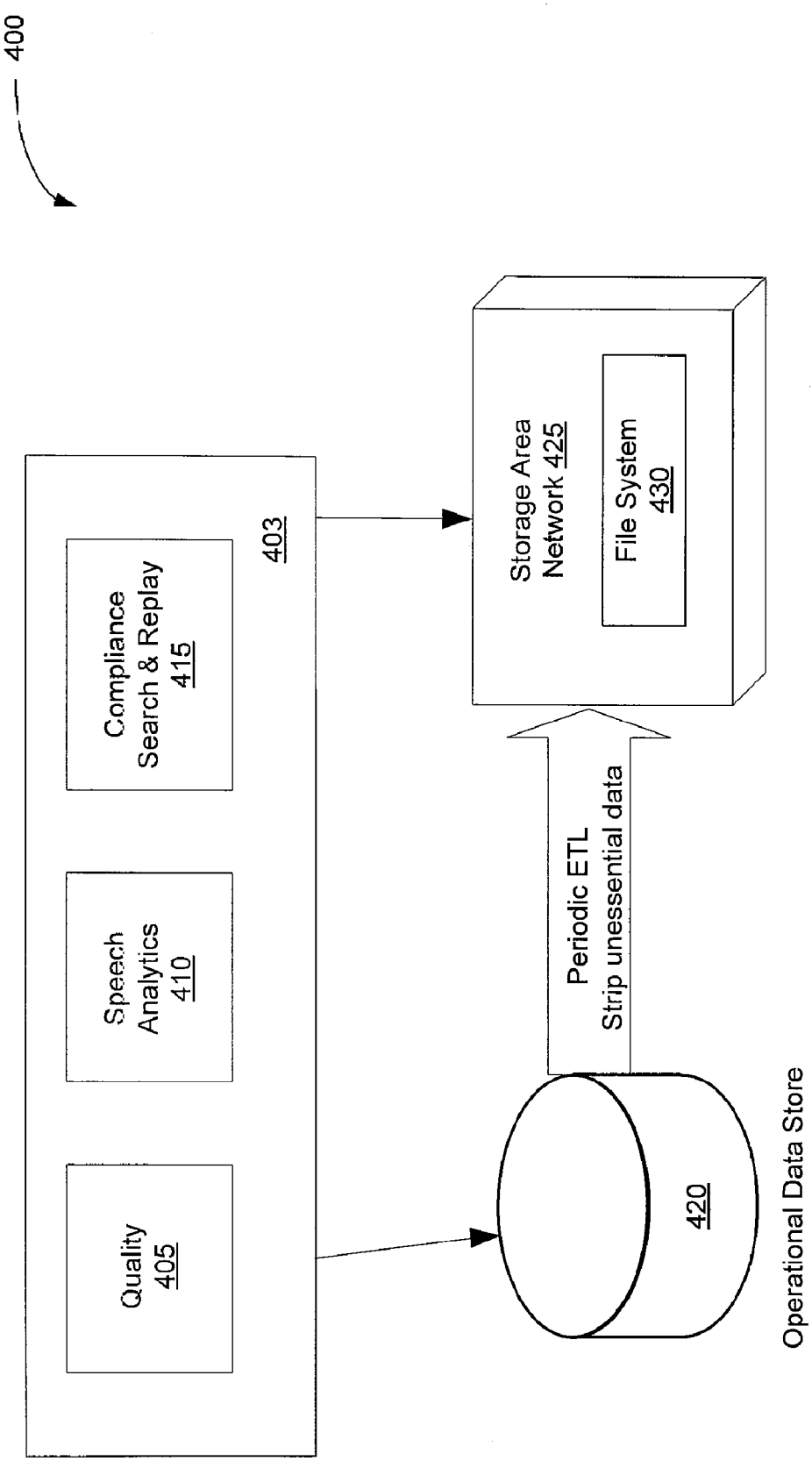
FIG. 4 is a block diagram illustrating an embodiment of a data storage system.

FIG. 4 is a block diagram illustrating an embodiment of a data storage system 400, which includes an operational data store (ODS) 420, a data source 403, and a storage area network (SAN) 425. The data source 403 includes quality 405, speech analytics 410, and compliance search & replay 415. The data source 403 communicates with the ODS 420 and storage area network (SAN) 425 to store, for example, recorded contacts and/or transparently search in both the ODS 420 and SAN 425. In general, the ODS 420 can integrate data from multiple sources, such as the data source 403. The integration generally refers to formatting the data from at least one source to facilitate operations, analysis and reporting. Because the data originates from multiple sources, the integration often includes cleaning, redundancy resolution and business rule enforcement. The ODS 420 periodically extracts, transforms, and loads (ETL) data from the data source 403 to the SAN 425. Alternatively or additionally, the ODS 420 can strip unessential data before loading data to the SAN 425.

The SAN 425 can further communicate with the data source 403 directly without receiving data from the ODS 420. The SAN 425 is generally a network that connects a computing device, such as those in the data source 403, to computer storage devices, such as, disk array controllers and tape libraries. Generally, the SAN has two variations. The first variation of SAN is a network, the primary purpose of which is the transfer of data between computer systems and storage elements. The SAN can include a communication infrastructure, which provides physical connections, and a management layer, which organizes the connections, storage elements, and computer systems so that data transfer is secure and robust.

The second variation of SAN is a storage network that can include storage elements, storage devices, computer systems, and/or appliances, plus all control software, communicating over a network. In a storage network, a server issues a request for specific blocks, or data segments, from specific disk drives. The storage networks can use a small computer system interface (SCSI) protocol for communication between servers and devices. SAN physical interfaces can include, but are not limited to, 1 Gbit Fibre Channel, 2 Gbit Fibre Channel, 4 Gbit Fibre Channel, and (in limited cases) 1 Gbit iSCSI. The SCSI protocol information can be carried over a lower level protocol via a mapping layer.

Some SANs allow duplication functionality such as "cloning" and "snapshotting," which allows for real-time duplication of a logical unit number (LUN), for the purposes of backup, disaster recovery, or system duplication. Cloning creates a complete replica of the LUN in the background (consuming I/O resources in the process), while snapshotting stores the original states of any blocks that get changed after the "snapshot" from the original LUN, and does not significantly slow the system.

The SAN 425 can include a file system 430 that can store and organize computer files. Such files can contain data to facilitate finding and accessing the files. The file system 430 can use a storage device such as a hard disk or CD-ROM. The file system 430 can be involved in maintaining the physical location of the files. The file system 430 can provide access to data on a file server by acting as clients for a network protocol (e.g., network file system (NFS), server message block (SMB), or plan 9 filesystem protocol (9P) clients). The file system 430 can be virtual and exist as an access method for virtual data.

In general, the file system 430 is a set of abstract data types that are implemented for the storage, hierarchical organization, manipulation, navigation, access, and retrieval of data. The file system 430 can make use of an underlying data storage device that offers access to an array of fixed-size blocks, generally 512 bytes each, for example. The file system 430 includes software that facilitates organizing the blocks into files and directories, and keeping track of which sectors belong to which file and which are not being used. Alternatively or additionally, the file system 430 can operate with a storage device. The file system 430 can be used to organize and provide access to any data, whether it be stored or dynamically generated (e.g., from a network connection).

With or without the use of storage devices, the file system 430 generally has directories that associate file names with files, usually by connecting the file name to an index into a file allocation table of some sort, such as the file allocation table (FAT) in an MS-DOS file system or in any other type of operating system which use file systems to store files. Directory structures may be flat, or allow hierarchies where directories may contain subdirectories. In some file systems, file names are structured, with special syntax for filename extensions and version numbers. In others, file names are simple strings, and per-file metadata is stored elsewhere.

Figure 5:
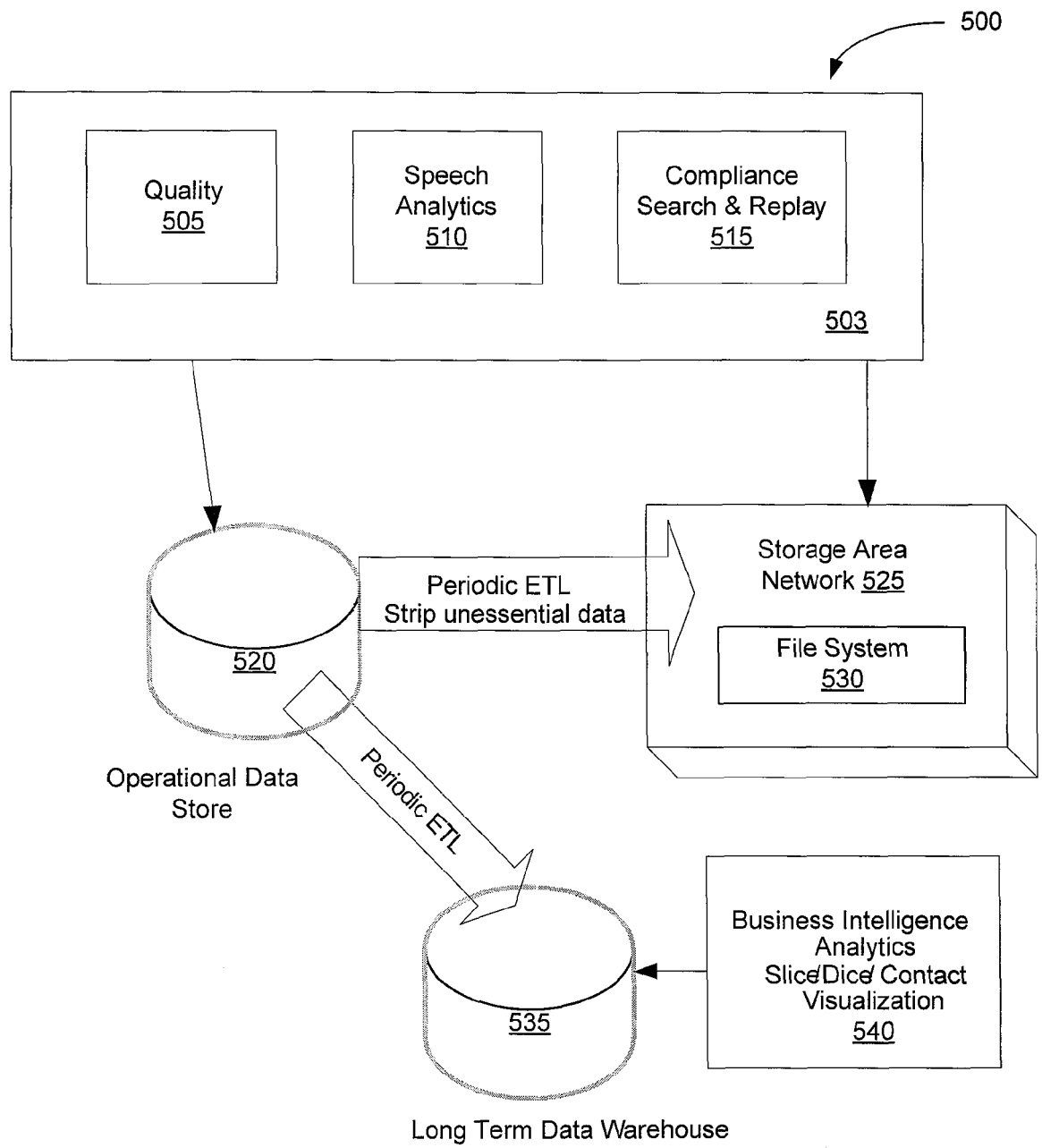
FIG. 5 is a block diagram illustrating another embodiment of a data storage system.

FIG. 5 is a block diagram illustrating another embodiment of a data storage system. The system 500 is similar to the system 400 in FIG. 4 described above. That is, the system 500 includes an ODS 520, a data source 503, and a SAN 525. The system 500 further includes a long term data warehouse 535, which the ODS 520 periodically extracts, transforms, and loads (ETL) data from the data source 503. The data warehouse 535 can be configured to store data for a certain period of time, such as, for example, one, five, or seven years, among others. The data in the data warehouse 535 can be processed for visualization, analytics, recording related functionalities (e.g., Slice/Dice/Contact), business intelligence, and performance planning, among others, such as that shown in block 540.

In general, the data warehouse is a computer system that archives and analyzes an organization's historical data, such as sales, salaries, or other information from day-to-day operations. The data warehouse can use a "dimensional" approach to organize the stored data. The dimensional approach stores data as "facts," which are numeric or text data that capture specific data about a single transaction or event, and "dimensions" which contain reference information, that allow each transaction or event to be classified in various ways.

FIG. 6 is an exemplary structured database, such as that shown in FIG. 3. The structured database 635 includes categories of data, such as agent ID 603, date of CTI event 606, talkover start time 609, talkover end time 613, ring time 616, and number of transfers 619, among others. In general, the structured database restricts the user from being able to search in categories that are available in the database. The search engine can search the categories available in the structured database based on received search parameters using, for example, concept-based searches and natural language queries. Alternatively or additionally, a specific graphical user interface (not shown) and specific query composition (not shown) can be used in conjunction with the search engine to communicate with the structured database.

Figure 7:
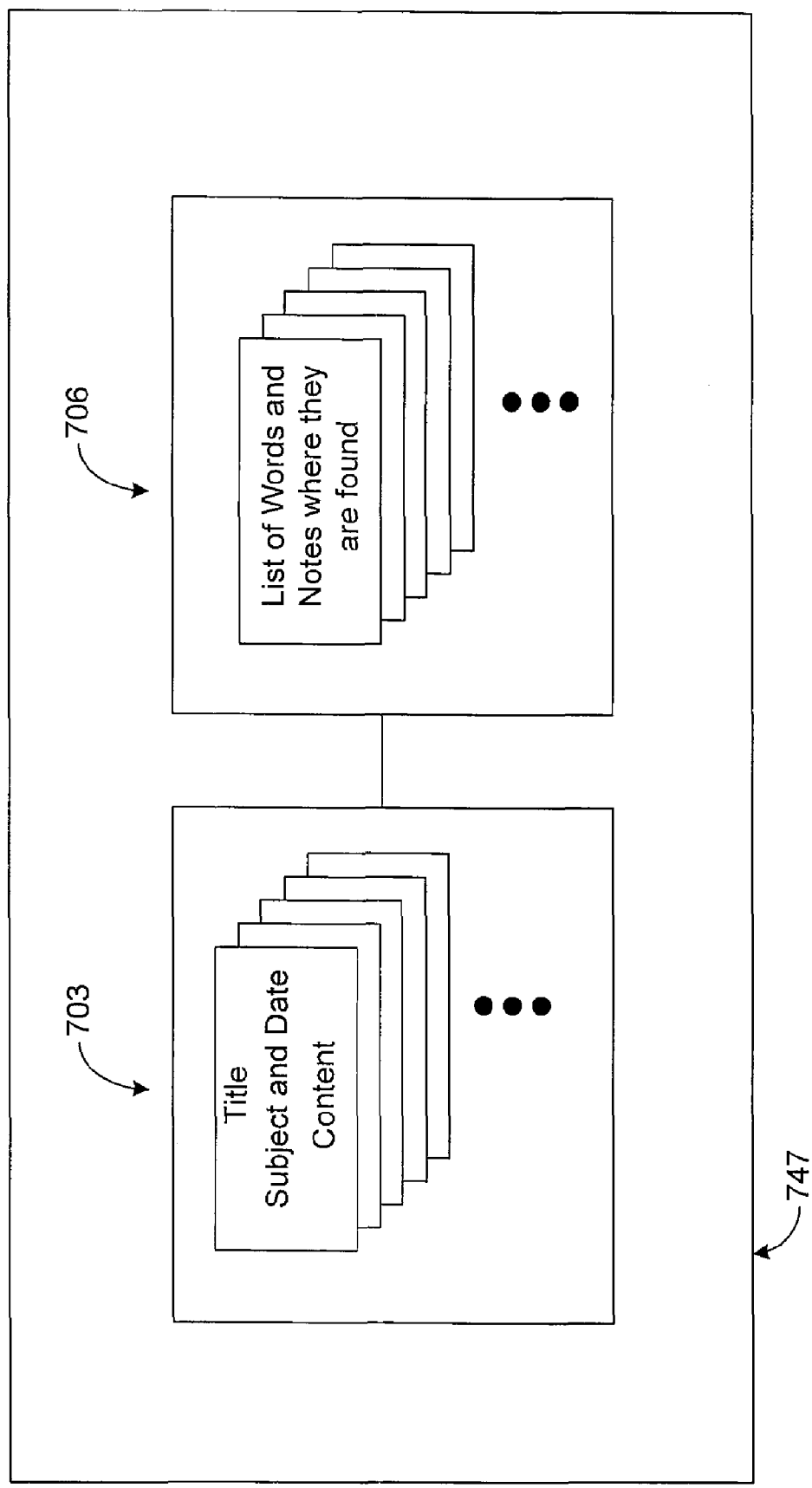
FIG. 7 is an exemplary unstructured database, such as that shown in FIG. 3.

FIG. 7 is an exemplary unstructured database, such as that shown in FIG. 3. The unstructured database 745 includes stored data 703 that corresponds to a respective index 706. The stored data can be in a text format that includes, by way of example, but is not limited to, the title of the data, subject and date of the data, and content of the data, among others. The corresponding index can include a list of words and notes where the words are found in the data 703.

Alternatively or additionally, at least one application of the data source can capture and store the data related to an interaction in a text format. For example, quality monitoring of the data source can store information corresponding to the interaction in the unstructured database 745 in which the information is floating around in a text format. The search engine can search for key words in the text, such as contact ID, start time, end time, DNIS, talk over start time, talk over end time, and competitors name, for example. The unstructured database 745 may include characters, integers, float, character large object (clob) and binary large object (blob).

Figure 8:
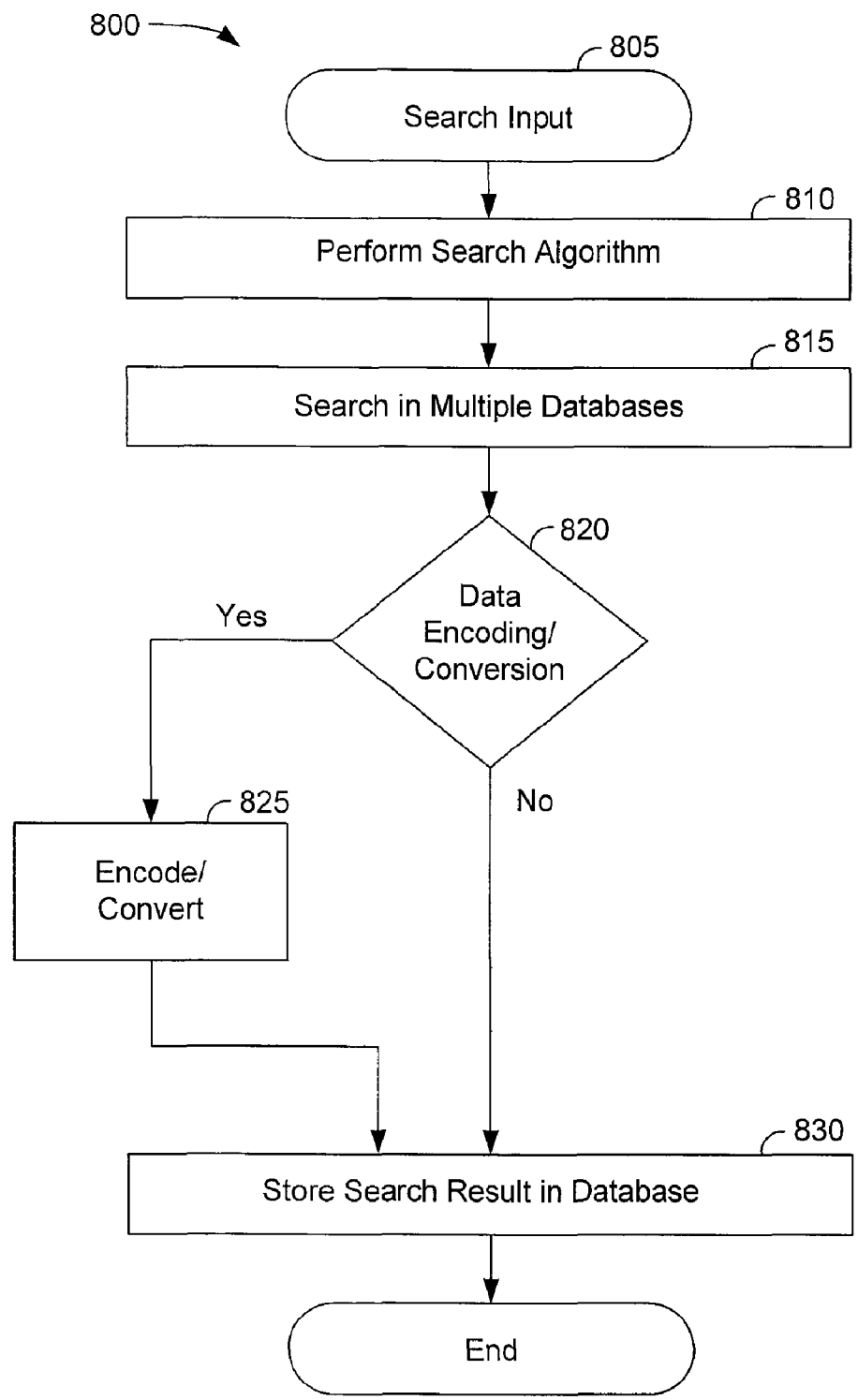
FIG. 8 is a flow diagram illustrating an exemplary process for searching a customer center system.

FIG. 8 is a flow diagram 800 illustrating an exemplary process for searching a customer center environment. Steps 805 and 810 inputs search parameters into the search engine and performs a search algorithm based on the inputted parameters. Step 815 searches in multiple databases across the customer center environment. The multiple databases include data that is generated from workforce applications and stored in either structured databases or unstructured databases, or both. The multiple databases can be located anywhere in the customer center such as in the data source, data mart, and data processing.

Based on the search results, step 820 determines whether the data is to be encoded and converted. If the data is to be converted, step 825 encodes and converts the data in, for example, either an XML format or HTML format, or both. Step 830 stores the data in a search result database. If the data is already in an XML or HTML format and does not need data encoding and/or conversion, then the data is stored in the search result database.

Figure 9:
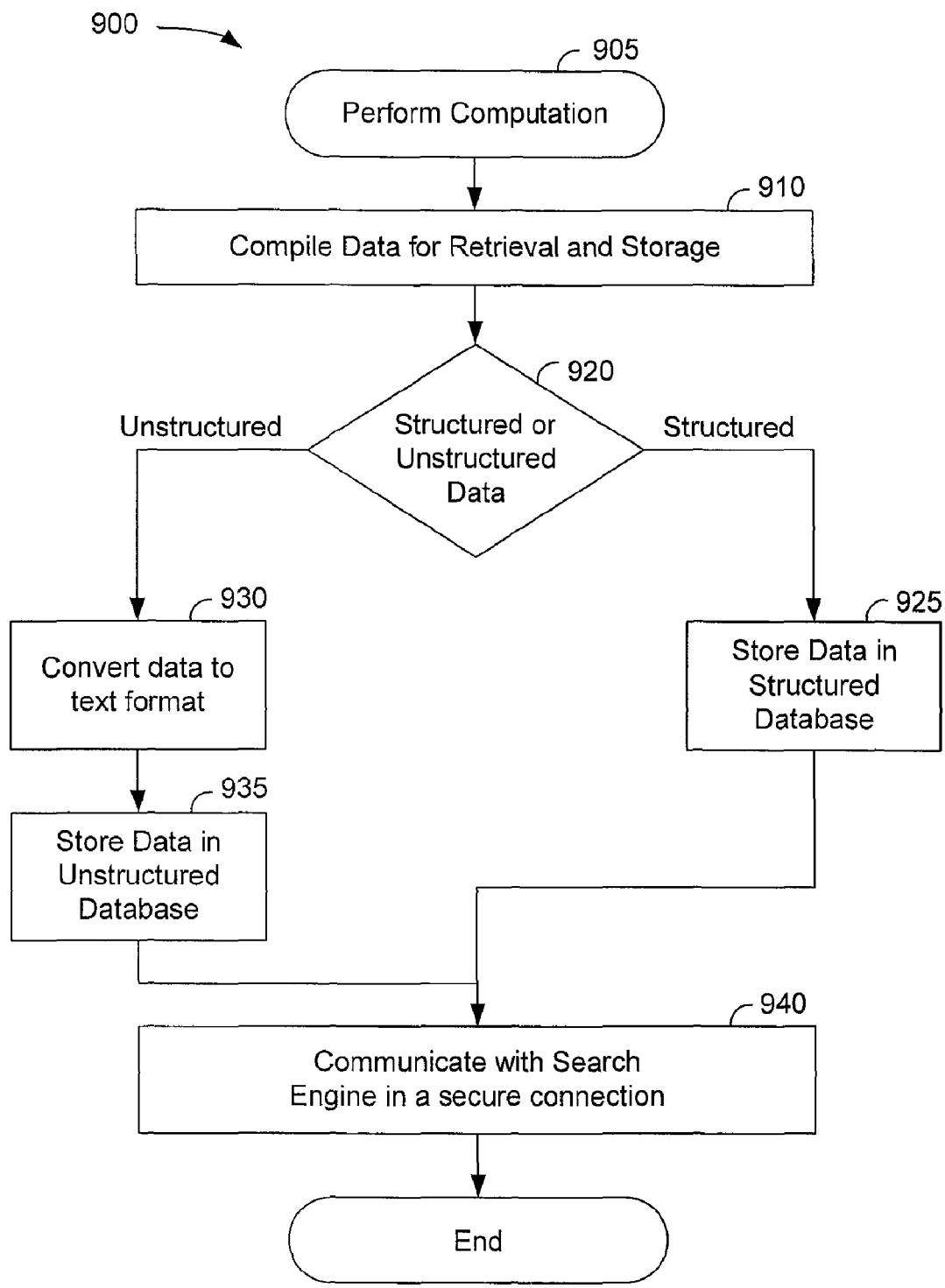
FIG. 9 is a flow diagram illustrating an exemplary process of a software application of a data source in a customer center system.

FIG. 9 is a flow diagram illustrating an exemplary process of a software application in a customer center environment. The process 900 includes the step 905 that performs computations of a related customer center analysis. Step 910 compiles the data from the computations for retrieval and storage. Step 920 determines whether the compiled data is to be stored in either a structured or unstructured database, or both. If the data is to be stored in an unstructured database, then step 930 converts the data to a text format, such as XML or HTML. Step 935 stores the data in an unstructured database.

If the data is determined to be stored in a structured database, step 925 extracts, transforms, and loads the data in a structured database. Step 940 provides communication between the databases and the search engine in a secure connection such that the search engine can search the databases. Alternatively or additionally, the data in the unstructured and/or structured databases can be transmitted to a data mart, such as that shown in FIG. 2, such that the search engine can search the data mart.

Figure 10:
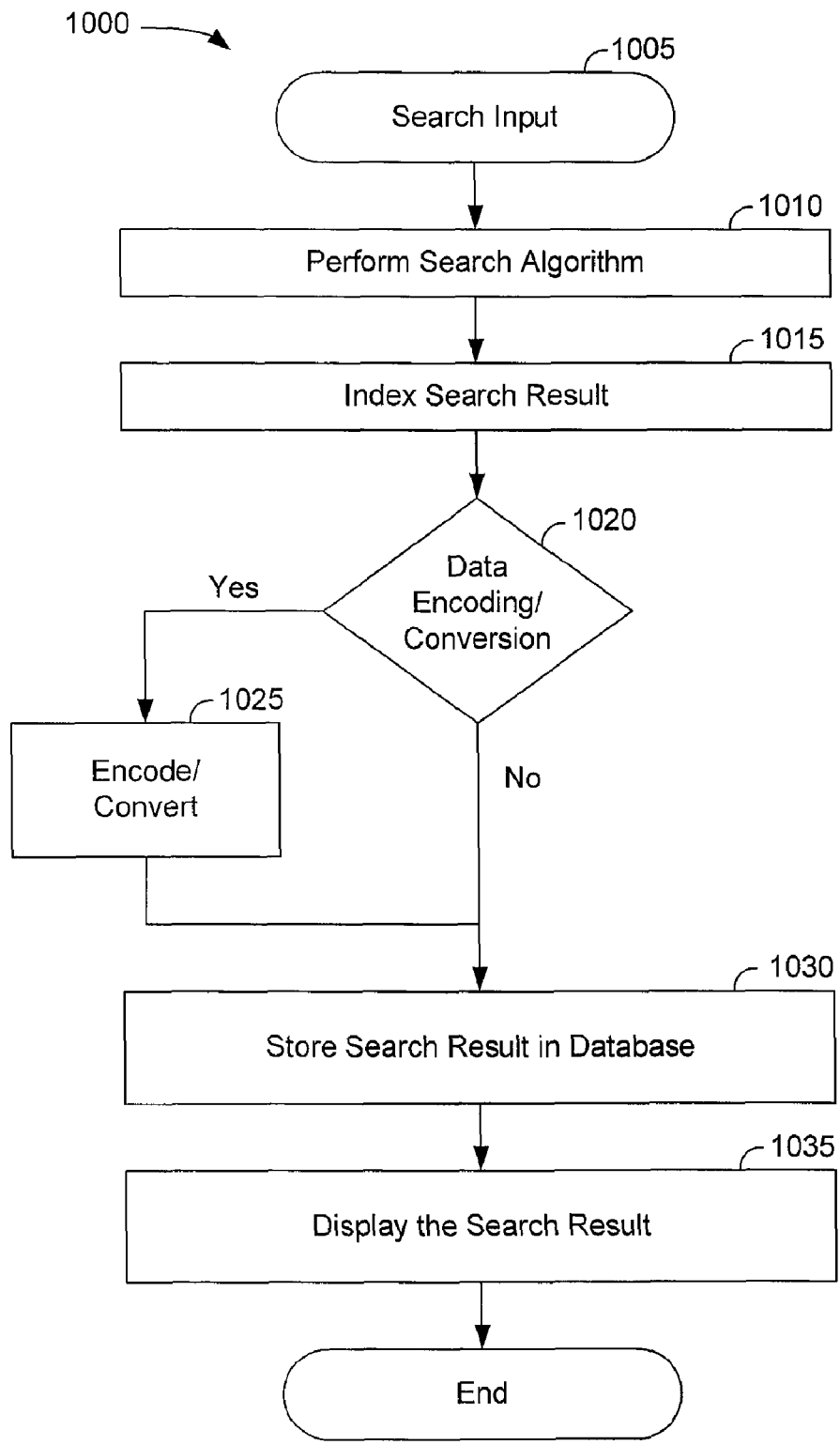
FIG. 10 is a flow diagram illustrating an exemplary process of a search engine in a customer center system.

FIG. 10 is a flow diagram illustrating an exemplary process 1000 of a search engine. Beginning with step 1005, search parameters are inputted into the search engine. Step 1010 performs a search algorithm using the inputted search parameters to generate a search result. Step 1015 indexes the data associated with the search result. Step 1020 determines whether the data should be encoded and/or converted in either an XML format or HTML format, or both.

If the data is not to be encoded and/or converted, then step 1030 stores the data associated with the search result in a search result database of the search engine. If the data is to be encoded and/or converted, then step 1025 encodes and converts the data in either the XML format or HTML format, or both. Step 1030 stores the encoded/converted data in the search result database. Step 1035 displays the search result on a display device.

Figure 11:
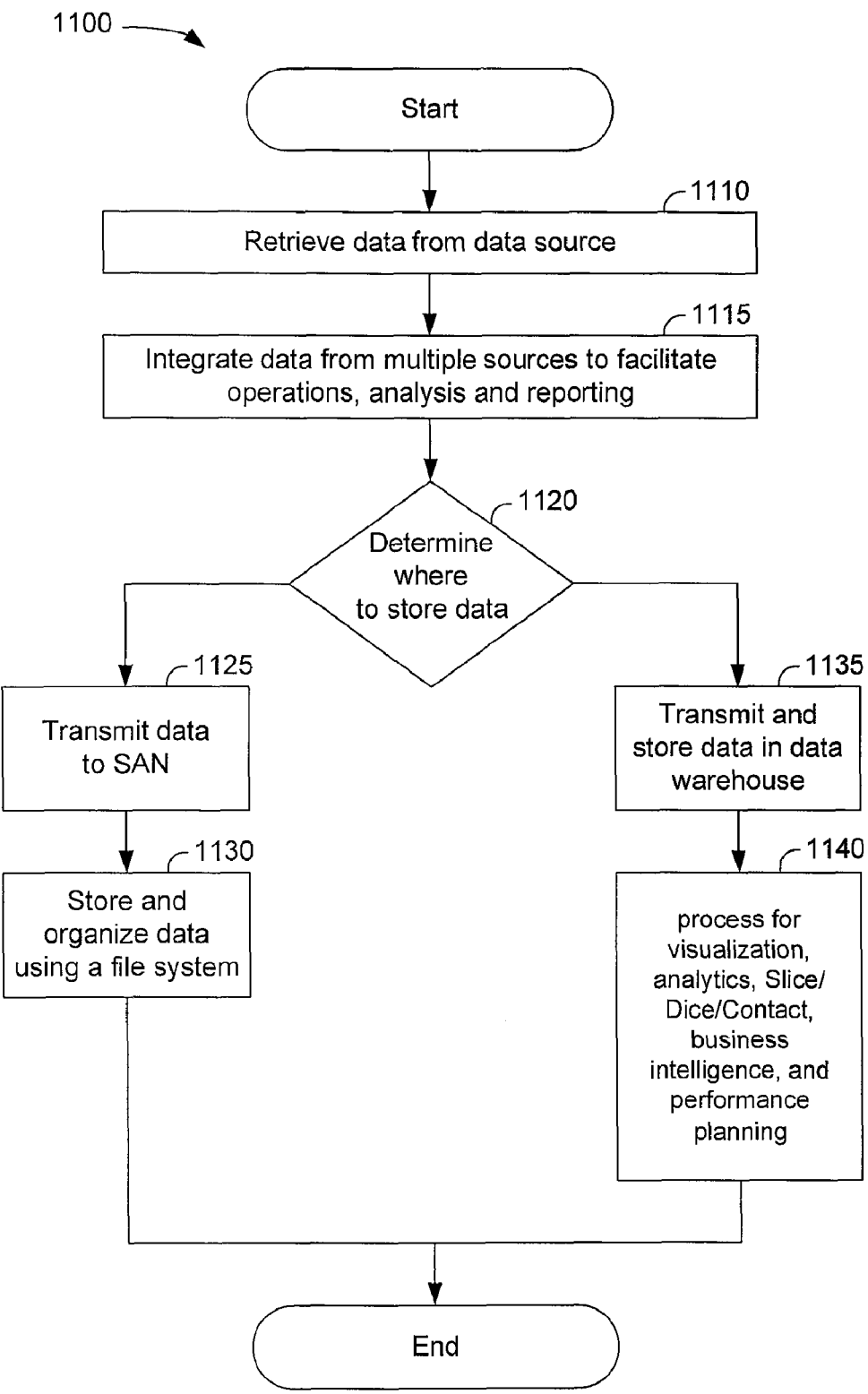
FIG. 11 is a flow diagram illustrating an exemplary process for storing data in a storage area network and a data warehouse.

FIG. 11 is a flow diagram illustrating an exemplary process for storing data in a storage area network and a data warehouse. Beginning with step 1010, the data is retrieved from a data source. Step 1015 integrates the data from multiple sources to facilitate operations, analysis and reporting. Step 1020 determines where to store the data, either in a storage area network (SAN) and/or a data warehouse. Responsive to determining that the data is to be stored in a SAN, step 1125 transmits the data to the SAN. Step 1130 stores and organizes the data using a file system. Responsive to determining that the data is to be stored in a data warehouse, step 1135 transmits the data to the data warehouse and step 1140 can process the stored data for visualization, analytics, recording related functionalities (e.g., Slice/Dice/Contact), business intelligence, and performance planning, among others.

Figure 12:
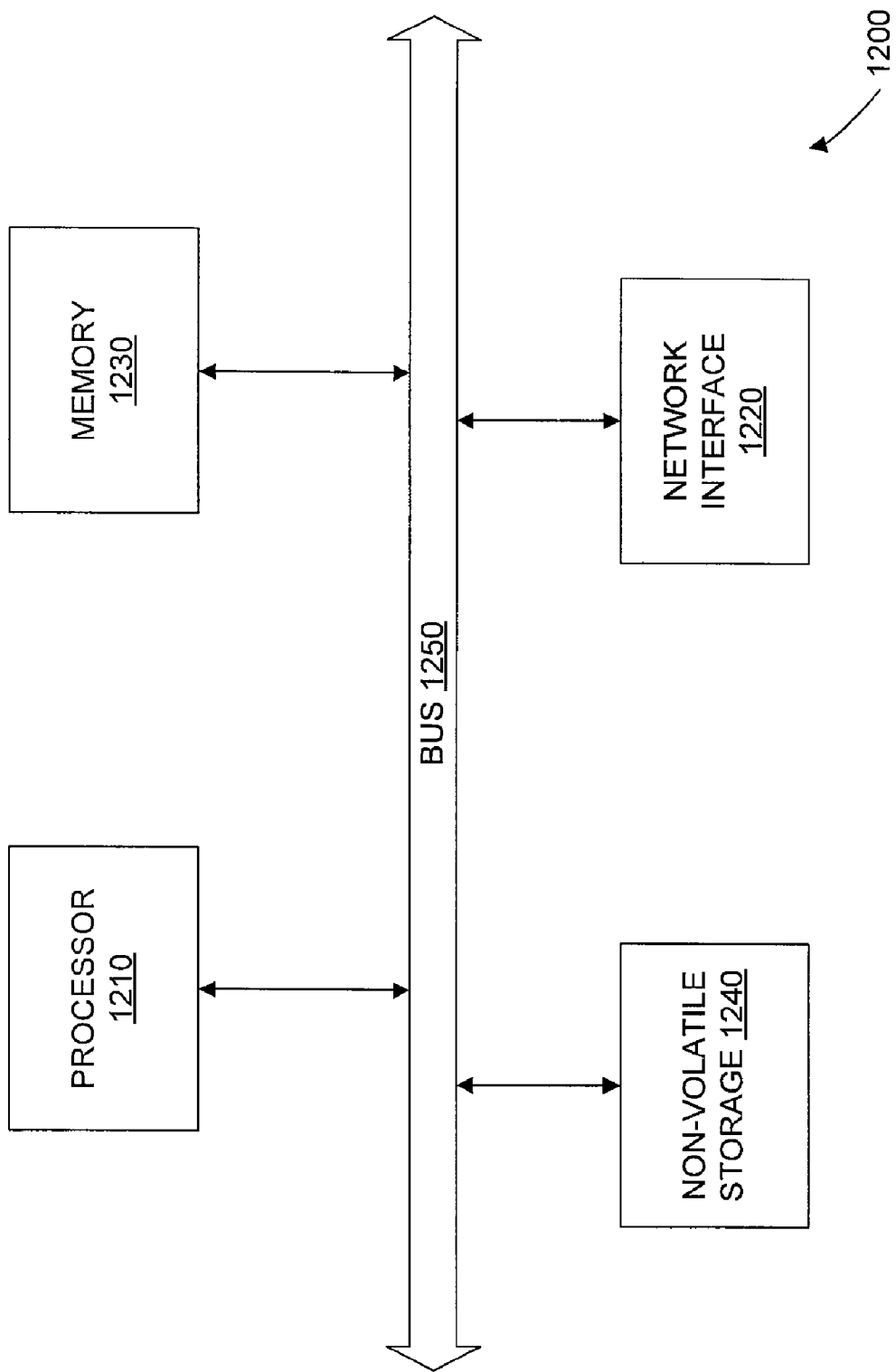
FIG. 12 is a hardware block diagram of a general-purpose computer that can be used to implement one or more of the components of an embodiment of an integrated customer center system.

FIG. 12 is a hardware block diagram of a general-purpose computer 1200 that can be used to implement one or more of the components of an embodiment of an integrated customer center system, such as disclosed herein. The computer 1200 contains a number of components that are well known in the art of call center software, including a processor 1210, a network interface 1220, memory 1230, and non-volatile storage 1240. Examples of non-volatile storage include, for example, a hard disk, flash RAM, flash ROM, EEPROM, etc. These components are coupled via a bus 1250. The memory 1230 contains instructions which, when executed by the processor 1210, implement the methods and systems disclosed herein. Omitted from FIG. 12 are a number of conventional components, known to those skilled in the art those are unnecessary to explain the operation of the system 1200.

The systems and methods disclosed herein can be implemented in software, hardware, or a combination thereof. In some embodiments, the system and/or method is implemented in software that is stored in a memory and that is executed by a suitable microprocessor (μP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain, store, communicate, propagate, or transport the program for use by, or in connection with, the instruction execution system. The computer readable medium can be, for example but not limited to, a system or propagation medium that is based on electronic, magnetic, optical, electromagnetic, infrared, or semiconductor technology.

Specific examples of a computer-readable medium using electronic technology would include (but are not limited to) the following: an electrical connection (electronic) having one or more wires; a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to) optical fiber and compact disc read-only memory (CD-ROM).

The scope of certain embodiments of the present disclosure includes embodying the functionality of the preferred embodiments of the present disclosure in logic embodied in hardware and/or software-configured media.

It should be noted that the flowcharts included herein show the architecture, functionality and/or operation of implementations. In this regard, each block can be interpreted to represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

It should be emphasized that the above-described embodiments are merely possible examples of implementations, merely set forth for a clear understanding of the principles of this disclosure. Many variations and modifications may be made to the above-described embodiments without departing substantially from the spirit and principles of the disclosure. All such modifications and variations are intended to be included herein within the scope of this disclosure.

Therefore, having thus described the disclosure, at least the following is claimed:

1. A method for storing and searching in a customer center system, comprising:
   generating data from workforce applications, at least one of the workforce applications including at least one of forecasting, scheduling, recording, and monitoring functionalities;
   determining whether at least some portions of the data should be stored in at least one of a plurality of unstructured databases or at least one of a plurality of structured databases, or both;
   converting at least a portion of the data into a text format, resulting in converted data;
   transferring the converted data for storing in the at least one of the plurality of unstructured databases;
   storing the data in the at least one of the plurality of unstructured databases or the at least one of the plurality of structured databases, or both, the unstructured and structured databases being operative to communicate with at least one of the workforce applications, wherein at least a portion of the data stored in the at least one of the plurality of unstructured databases is the converted data;
   receiving search parameters that are used to search the data in the at least one of the plurality of unstructured databases or the at least one of the plurality of structured databases, or both;
   searching the at least one of the plurality of unstructured databases and the at least one of the plurality of structured databases according to the search parameters, resulting in search results, wherein the search results indicate a portion of the data associated with the search results from the at least one of the plurality of unstructured databases and the at least one of the plurality of structured databases;
   determining whether each of the search results is from the at least one of the plurality of structured databases or the at least one of the plurality of unstructured databases;
   indexing the portion of the data associated with the search results;
   storing the portion of the data associated with the search results in a search result database; and
   displaying the search results on a display device.

2. The method of claim 1, wherein the at least one of the plurality of structured databases comprises data that has been categorized, and the at least one of the plurality of unstructured databases comprises unstructured data that does not exhibit a data structure.

3. The method of claim 1, further comprising responsive to one of the search results being from the at least one of the plurality of structured databases, encoding and converting the portion of the data associated with the one of the search results to a text format, resulting in converted search results data.

4. The method of claim 1, wherein storing the data in the at least one of the plurality of unstructured databases comprises storing the converted data in the at least one of the plurality of unstructured databases.

5. The method of claim 3, further comprising storing the converted search results data in the search result database.

6. The method of claim 1, further comprising:
   planning at least one campaign to implement goals;
   scheduling and deploying a workforce in accordance with the at least one campaign to produce a plurality of agent-customer interactions;
   measuring performance of an agent on at least a portion of the plurality of agent-customer interactions to produce a set of quality metrics for the agent;
   analyzing the set of quality metrics to produce a rating of the measured interactions;
   combining at least a portion of the set of quality metrics to produce performance indicators; and
   using the performance indicators in the planning step of a second campaign or another iteration of the at least one campaign.

7. A system for storing and searching in a customer center system, comprising:
   a plurality of workforce applications, the plurality of workforce applications including at least one of forecasting, scheduling, recording, and monitoring functionalities, at least one of the plurality of workforce applications being operative to generate data related to customer center functionalities when executed by a workforce application apparatus;
   a non-transitory computer readable medium having a plurality of unstructured databases and a plurality of structured databases being operative to store the data, the plurality of unstructured databases and the plurality of structured databases being operative to communicate with the at least one of the plurality of workforce applications, wherein at least a portion of the data stored in at least one of the plurality of unstructured databases is converted data;
   a determining component configured to determine whether at least some portions of the data should be stored in the at least one of the plurality of unstructured databases or the at least one of the plurality of structured databases, or both;
   a converter configured to convert at least a portion of the data into a text format, resulting in the converted data, and transfer the converted data for storing in the at least one of the plurality of unstructured databases; and
   one or more computer systems having a search engine operative to:
      receive search parameters that are used to search the data in the plurality of unstructured databases or the plurality of structured databases, or both,
      search the plurality of unstructured databases and the plurality of structured databases according to the search parameters, resulting in search results, wherein the search results indicate a portion of the data associated with the search results from the at least one of the plurality of unstructured databases and the at least one of the plurality of structured databases, determine whether each of the search results is from the at least one of the plurality of structured databases or the at least one of the plurality of unstructured databases, or both, index the portion of the data associated with the search results, store the portion of the data associated with the search results in a search result database, and display the search results on a display device.

8. The system of claim 7, wherein the at least one of the plurality of structured databases comprises data that has been categorized, and the at least one of the plurality of unstructured databases comprises unstructured data that does not exhibit a data structure.

9. The system of claim 7, wherein responsive to one of the search results being from the at least one of the plurality of structured databases, the search engine further configured to encode and convert the portion of the data associated with the one of the search results to a text format, resulting in converted search results data.

10. The system of claim 9, wherein the search result database comprises the converted search results data.

11. The system of claim 7, wherein the plurality of unstructured databases are operative to store the converted data.

12. A system for storing and searching in a customer center system, comprising:

a plurality of workforce applications, the plurality of workforce applications including at least one of forecasting, scheduling, recording, and monitoring functionalities, at least one of the plurality of workforce applications being operative to generate data related to customer center functionalities when executed by a workforce application apparatus;

a plurality of unstructured databases and a plurality of structured databases being operative to store the data in a non-transitory computer readable medium, the plurality of unstructured databases and the plurality of structured databases being operative to communicate with the at least one of the plurality of workforce applications, wherein at least a portion of the data stored in at least one of the plurality of unstructured databases is converted data;

a determining component configured to determine whether at least some portions of the data should be stored in the at least one of the plurality of unstructured databases or the at least one of the plurality of structured databases, or both;

a converter configured to convert at least a portion of the data into a text format, resulting in the converted data, and transfer the converted data for storing in the at least one of the plurality of unstructured databases;

one or more computer systems having a search engine operative to:

receive search parameters that are used to search the data in the plurality of unstructured databases or the plurality of structured databases, or both, search the plurality of unstructured databases and the plurality of structured databases, or both, according to the search parameters, resulting in search results, wherein the search results indicate a portion of the data associated with the search results from the at least one of the plurality of unstructured databases and the at least one of the plurality of structured databases, determine whether each of the search results is from the at least one of the plurality of structured databases or the at least one of the plurality of unstructured databases, index the portion of the data associated with the search results, store the portion of the data associated with the search results in a search result database, and display the search results on a display device;

wherein the at least one of the plurality of structured databases comprises data that has been categorized, wherein the search engine being operative to determine whether the search results are from the at least one of the plurality of structured databases or the at least one of the plurality of unstructured databases, or both.

* * * * *